United States Patent
Zeng

(10) Patent No.: US 10,444,822 B2
(45) Date of Patent: *Oct. 15, 2019

(54) METHOD FOR MANAGING CENTRAL PROCESSING UNIT AND RELATED PRODUCTS

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,366

(22) Filed: Jan. 11, 2019

(65) Prior Publication Data

US 2019/0146573 A1    May 16, 2019

Related U.S. Application Data

(63) Continuation of application No. 16/122,400, filed on Sep. 5, 2018, which is a continuation of application No. PCT/CN2017/086453, filed on May 27, 2017.

(30) Foreign Application Priority Data

May 31, 2016  (CN) .......................... 2016 1 0380645

(51) Int. Cl.
*G06F 1/26* (2006.01)
*G06F 1/3287* (2019.01)
(Continued)

(52) U.S. Cl.
CPC .............. *G06F 1/3287* (2013.01); *G06F 1/32* (2013.01); *G06F 1/3203* (2013.01);
(Continued)

(58) Field of Classification Search
CPC .. G06F 1/3287; G06F 1/3228; G06F 11/3024; G06F 11/3055; G06F 11/3495; G06N 5/04
(Continued)

(56) References Cited

U.S. PATENT DOCUMENTS

2009/0150695 A1* 6/2009 Song .................. G06F 1/3203
                                                                713/323
2010/0100716 A1   4/2010 Scott et al.
(Continued)

FOREIGN PATENT DOCUMENTS

CN           1613044 A        5/2005
CN        102656539 A         9/2012
(Continued)

OTHER PUBLICATIONS

International search report issued in corresponding international application No. PCT/CN2017/086453 dated Aug. 17, 2017.
(Continued)

*Primary Examiner* — Volvick Derose
(74) *Attorney, Agent, or Firm* — Young Basile Hanlon & MacFarlane, P.C.

(57) ABSTRACT

A method for managing a central processing unit (CPU) and related products are provided. The method includes the follows. A first prediction condition and a second prediction condition are determined. A prediction accuracy rate of predicting the CPU entering a lower power mode (LPM) by using the first prediction condition is counted. The first prediction condition is continued to be used to predict a next wake-up moment of the CPU when the prediction accuracy rate is greater than a predetermined threshold. The second prediction condition is used to predict the next wake-up moment of the CPU when the prediction accuracy rate is not greater than the predetermined threshold.

9 Claims, 5 Drawing Sheets

(51) Int. Cl.
*G06F 1/32* (2019.01)
*G06F 1/3203* (2019.01)
*G06F 1/3228* (2019.01)
*G06F 1/3234* (2019.01)
*G06F 11/30* (2006.01)
*G06F 11/34* (2006.01)
*G06N 5/04* (2006.01)
*G06F 1/3215* (2019.01)

(52) U.S. Cl.
CPC .......... *G06F 1/3228* (2013.01); *G06F 1/3234* (2013.01); *G06F 11/3024* (2013.01); *G06F 11/3055* (2013.01); *G06F 11/3495* (2013.01); *G06N 5/04* (2013.01); *G06F 1/3215* (2013.01)

(58) Field of Classification Search
USPC .......................................... 713/323
See application file for complete search history.

(56) References Cited

U.S. PATENT DOCUMENTS

| | | | | |
|---|---|---|---|---|
| 2010/0332874 A1* | 12/2010 | Itabashi | ............... | G06F 1/3206 713/322 |
| 2011/0161627 A1* | 6/2011 | Song | ............... | G06F 1/3203 712/30 |
| 2011/0173474 A1* | 7/2011 | Salsbery | ............... | G06F 1/206 713/323 |
| 2013/0198540 A1* | 8/2013 | Lee | ............... | G06F 1/32 713/320 |
| 2013/0290758 A1* | 10/2013 | Quick | ............... | G06F 1/3203 713/323 |
| 2014/0006820 A1* | 1/2014 | McKenney | ............... | G06F 1/3206 713/320 |
| 2014/0149772 A1* | 5/2014 | Arora | ............... | G06F 1/3234 713/323 |
| 2014/0181556 A1* | 6/2014 | Eckert | ............... | G06F 1/324 713/323 |
| 2014/0289546 A1* | 9/2014 | Min | ............... | G06F 1/3228 713/323 |
| 2014/0342727 A1* | 11/2014 | Heinrich | ............... | H04W 52/0229 455/422.1 |
| 2015/0185801 A1* | 7/2015 | Arora | ............... | G06F 1/3287 713/320 |
| 2015/0198991 A1* | 7/2015 | Birchen | ............... | G06F 1/329 713/323 |
| 2015/0286271 A1* | 10/2015 | Vrind | ............... | G06F 1/329 713/323 |
| 2015/0370311 A1* | 12/2015 | Eckert | ............... | G06F 1/3296 713/323 |
| 2016/0314024 A1* | 10/2016 | Chang | ............... | G06F 9/5088 |
| 2016/0321183 A1* | 11/2016 | Govindan | ............... | G06F 12/0862 |

FOREIGN PATENT DOCUMENTS

| | | |
|---|---|---|
| CN | 103218033 A | 7/2013 |
| CN | 104094191 A | 10/2014 |
| CN | 104184907 A | 12/2014 |

OTHER PUBLICATIONS

Extended European search report issued in corresponding European application No. 17805803.8 dated Feb. 5, 2019.

* cited by examiner

METHOD FOR MANAGING CENTRAL PROCESSING UNIT AND RELATED PRODUCTS

CROSS-REFERENCE TO RELATED APPLICATION(S)

This application is a continuation of U.S. application Ser. No. 16/122,400, field on Sep. 5, 2018, which is a continuation of International Application PCT/CN2017/086453, filed on May 27, 2017, which claims the priority of Chinese Patent Application No. 201610380645.1, filed on May 31, 2016, the contents of all of which are herein incorporated by reference in their entireties.

TECHNICAL FIELD

The present disclosure relates to the field of computers, and particularly to a method for managing a central processing unit and related products.

BACKGROUND

In an operating system that is currently widely used, when a task runs in a central processing unit (CPU), the CPU is in an active state. When the task is completed or removed, the CPU will enter a low power mode (LPM).

SUMMARY

According to a first aspect of implementations of the present disclosure, there is provided a method for managing a central processing unit. The method includes the following.

A first prediction condition and a second prediction condition are determined. The first prediction condition is a timer value. The second prediction condition is an interrupt moment. A response time of a central processing unit (CPU) in a target lower power mode (LPM) is determined, after the timer value is determined as a prediction condition to predict a next wake-up moment of the CPU and the CPU enters the target LPM. Whether the response time of the CPU in the target LPM is between a sleep time of the CPU in the target LPM and the timer value of the CPU is determined. The prediction is determined as an inaccurate prediction based on a determination that the response time of the CPU in the target LPM is between the sleep time of the CPU in the target LPM and the timer value of the CPU. The prediction is determined as an accurate prediction, based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold. A prediction accuracy rate is counted after the next wake-up moment of the CPU is predicted by using the timer value as the prediction condition for a pre-determined number of times. The first prediction condition is continued to use to predict the next wake-up moment of the CPU when the prediction accuracy rate is greater than a predetermined threshold, and the second prediction condition is used to predict the next wake-up moment of the CPU when the prediction accuracy rate is not greater than the predetermined threshold.

According to a second aspect of the implementations of the present disclosure, there is provided an apparatus for managing a CPU. The apparatus includes a condition determining unit, a time determining unit, an accurate and inaccurate prediction determining unit, a counting unit, and a prediction controlling unit. The condition determining unit is configured to determine a first prediction condition and a second prediction condition. The first prediction condition is a timer value and the second prediction condition is an interrupt moment. The time determining unit is configured to determine a response time of a CPU in a LPM, after the prediction controlling unit determines the timer value as a prediction condition to predict a next wake-up moment of the CPU and the CPU enters the target LPM. The accurate and inaccurate prediction determining unit is configured to determine whether the response time of the CPU in the target LPM is between a sleep time of the CPU in the target LPM and the timer value of the CPU, to determine the prediction as an inaccurate prediction based on a determination that the response time of the CPU in the target LPM is between the sleep time of the CPU in the target LPM and the timer value of the CPU, and to determine the prediction as an accurate prediction based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold. The counting unit is configured to count a prediction accuracy rate after predicting the next wake-up moment of the CPU by using the timer value as the prediction condition for a pre-determined number of times. The prediction controlling unit is configured to continue to use the first prediction condition to predict the next wake-up moment of the CPU when the counting unit determines that the prediction accuracy rate is greater than a predetermined threshold, and to use the second prediction condition to predict the next wake-up moment of the CPU when the counting unit determines that the prediction accuracy rate is not greater than the predetermined threshold.

According to a third aspect of the disclosure, there is provided an electronic device. The electronic device includes a CPU and a memory. The CPU is configured to execute actions including the following. A first prediction condition and a second prediction condition are determined. The first prediction condition is a timer value. The second prediction condition is an interrupt moment. A response time of a CPU in a target lower power mode (LPM) is determined, after the timer value is determined as a prediction condition to predict a next wake-up moment of the CPU and the CPU enters the target LPM. Whether the response time of the CPU in the target LPM is between a sleep time of the CPU in the target LPM and the timer value of the CPU is determined. The prediction is determined as an inaccurate prediction based on a determination that the response time of the CPU in the target LPM is between the sleep time of the CPU in the target LPM and the timer value of the CPU. The prediction is determined as an accurate prediction, based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold. A prediction accuracy rate is counted after the next wake-up moment of the CPU is predicted by using the timer value as the prediction condition for a pre-determined number of times. The first prediction condition is continued to use to predict the next wake-up moment of the CPU when the prediction accuracy rate is greater than a predetermined threshold, and the second prediction condition is used to predict the next wake-up moment of the CPU when the prediction accuracy rate is not greater than the predetermined threshold.

BRIEF DESCRIPTION OF DRAWINGS

In order to illustrate technical solutions of implementations of the present disclosure more clearly, the drawings used in the implementations will be briefly described below.

DETAILED DESCRIPTION

Figure 1:
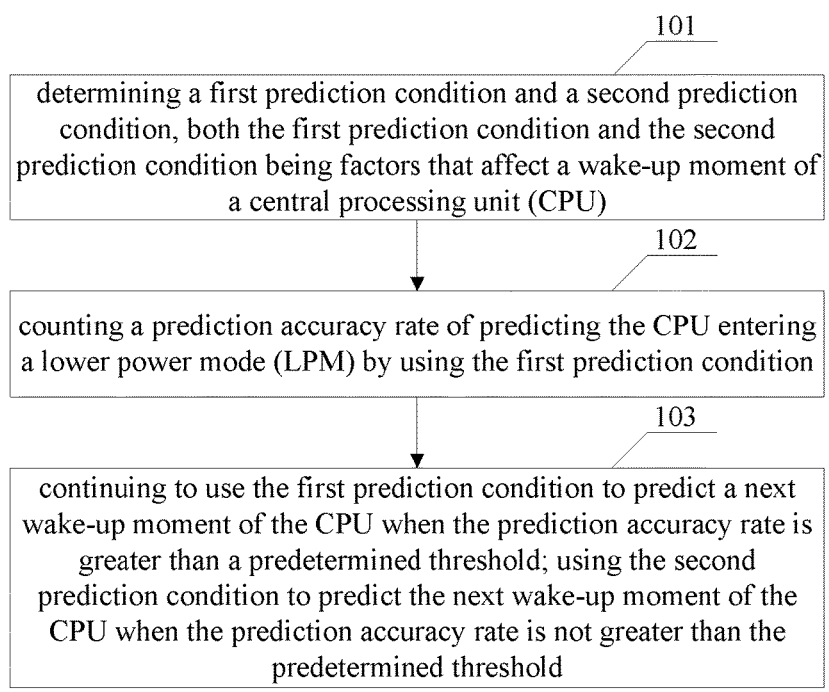
FIG. 1 is a schematic flow chart of a method for managing a central processing unit according to an implementation of the present disclosure.

In order to make the purpose, technical solutions, and advantages of the present disclosure clearer, implementations of the disclosure will be described in detail with reference to the accompanying drawings. Obviously, implementations described below are merely part of rather than all of the implementations of the present disclosure. Based on the implementations of the present disclosure, other implementations obtained there from without any creative work by those of ordinary skill in the art shall fall into the protection scope of the present disclosure.

According to a first aspect of implementations of the present disclosure, there is provided a method for managing a central processing unit. The method includes: determining a first prediction condition and a second prediction condition, both the first prediction condition and the second prediction condition being factors that affect a wake-up moment of a central processing unit (CPU); counting a prediction accuracy rate of predicting the CPU entering a lower power mode (LPM) by using the first prediction condition; continuing to use the first prediction condition to predict a next wake-up moment of the CPU when the prediction accuracy rate is greater than a predetermined threshold; using the second prediction condition to predict the next wake-up moment of the CPU when the prediction accuracy rate is not greater than the predetermined threshold.

In an implementation, the first prediction condition is a timer value and the second prediction condition is an interrupt moment.

In an implementation, the counting a prediction accuracy rate of predicting the CPU entering a LPM by using the first prediction condition includes: determining a response time of the CPU in a target LPM, after determining the timer value as a prediction condition to predict the next wake-up moment of the CPU and the CPU enters the target LPM; determining whether the response time of the CPU in the target LPM is between a sleep time of the CPU in the target LPM and the timer value of the CPU; determining the prediction as an inaccurate prediction based on a determination that the response time of the CPU in the target LPM is between the sleep time of the CPU in the target LPM and the timer value of the CPU; counting the prediction accuracy rate after predicting the next wake-up moment of the CPU by using the timer value as the prediction condition for a pre-determined number of times.

In an implementation, the counting the prediction accuracy rate includes: counting the prediction accuracy rate by determining situations other than inaccurate predictions as corresponding to accurate predictions.

In an implementation, the counting a prediction accuracy rate of predicting the CPU entering a LPM by using the first prediction condition includes: determining the prediction as an accurate prediction, based on a determination of one of the following: the response time of the CPU in target LPM is longer than the sleep time of the CPU in the LPM and the timer value of the CPU; the response time of the CPU in the target LPM is less than the sleep time of the CPU in the LPM and the timer value of the CPU; a difference between the sleep time of the CPU in the LPM and the timer value of the CPU is less than a pre-determined threshold; counting the prediction accuracy rate after predicting the next wake-up moment of the CPU by using the timer value as the prediction condition for a pre-determined number of times.

In an implementation, the counting the prediction accuracy rate includes: counting the prediction accuracy rate by determining situations corresponding to accurate predictions as an accurate set and determining situations that do not belong to the accurate set as corresponding to inaccurate predictions.

In an implementation, the counting a prediction accuracy rate of predicting the CPU entering a LPM by using the first prediction condition includes: determining a response time of the CPU in a target LPM, after determining the timer value as a prediction condition to predict the next wake-up moment of the CPU and the CPU enters the target LPM; determining whether the response time of the CPU in the target LPM is between a sleep time of the CPU in the target LPM and the timer value of the CPU; determining the prediction as an inaccurate prediction based on a determination that the response time of the CPU in the target LPM is between the sleep time of the CPU in the target LPM and the timer value of the CPU; determining the prediction as an accurate prediction, based on a determination of one of the following: the response time of the CPU in target LPM is longer than the sleep time of the CPU in the LPM and the timer value of the CPU; the response time of the CPU in the target LPM is less than the sleep time of the CPU in the LPM and the timer value of the CPU; a difference between the sleep time of the CPU in the LPM and the timer value of the CPU is less than a pre-determined threshold; counting the prediction accuracy rate after predicting the next wake-up moment of the CPU by using the timer value as the prediction condition for a pre-determined number of times.

In an implementation, the counting the prediction accuracy rate includes: counting the prediction accuracy rate by determining situations corresponding to accurate predictions and inaccurate predictions as a full set and counting a proportion of the accurate predictions in the full set.

In an implementation, the method for managing a CPU is applicable for managing a multi-core CPU.

In an implementation, the LPM includes at least one of: a waiting-for-interrupt mode, a suspending mode, and a power-down mode.

According to a second aspect of the implementations of the present disclosure, there is provided an electronic device, which includes at least one processor and a computer readable storage coupled to the at least one processor. The computer readable storage stores at least one computer executable instruction thereon, which when executed by the at least one processor, cause the at least one processor to carry out actions, including: determining a first prediction condition and a second prediction condition, both the first prediction condition and the second prediction condition being factors that affect a wake-up moment of a central processing unit (CPU); counting a prediction accuracy rate of predicting the CPU entering a lower power mode (LPM) by using the first prediction condition; continuing to use the first prediction condition to predict a next wake-up moment of the CPU when the prediction accuracy rate is greater than a predetermined threshold; using the second prediction condition to predict the next wake-up moment of the CPU when the prediction accuracy rate is not greater than the predetermined threshold.

In an implementation, the first prediction condition is a timer value and the second prediction condition is an interrupt moment.

In an implementation, the at least one processor carrying out the action of counting a prediction accuracy rate of predicting the CPU entering a LPM by using the first prediction condition is caused to carry out actions, including: determining a response time of the CPU in a target LPM, after determining the timer value as a prediction condition to predict the next wake-up moment of the CPU and the CPU enters the target LPM; determining whether the response time of the CPU in the target LPM is between a sleep time of the CPU in the target LPM and the timer value of the CPU; determining the prediction as an inaccurate prediction based on a determination that the response time of the CPU in the target LPM is between the sleep time of the CPU in the target LPM and the timer value of the CPU; counting the prediction accuracy rate after predicting the next wake-up moment of the CPU by using the timer value as the prediction condition for a pre-determined number of times.

In an implementation, the at least one processor carrying out the action of counting the prediction accuracy rate is caused to carry out actions, including: counting the prediction accuracy rate by determining situations other than inaccurate predictions as corresponding to accurate predictions.

In an implementation, the at least one processor carrying out the action of counting a prediction accuracy rate of predicting the CPU entering a LPM by using the first prediction condition is caused to carry out actions, including: determining the prediction as an accurate prediction, based on a determination of one of the following: the response time of the CPU in target LPM is longer than the sleep time of the CPU in the LPM and the timer value of the CPU; the response time of the CPU in the target LPM is less than the sleep time of the CPU in the LPM and the timer value of the CPU; a difference between the sleep time of the CPU in the LPM and the timer value of the CPU is less than a pre-determined threshold; counting the prediction accuracy rate after predicting the next wake-up moment of the CPU by using the timer value as the prediction condition for a pre-determined number of times.

In an implementation, the at least one processor carrying out the action of counting the prediction accuracy rate is caused to carry out actions, including: counting the prediction accuracy rate by determining situations corresponding to accurate predictions as an accurate set and determining situations that do not belong to the accurate set as corresponding to inaccurate predictions.

In an implementation, the at least one processor carrying out the action of counting a prediction accuracy rate of predicting the CPU entering a LPM by using the first prediction condition is caused to carry out actions, including: determining a response time of the CPU in a target LPM, after determining the timer value as a prediction condition to predict the next wake-up moment of the CPU and the CPU enters the target LPM; determining whether the response time of the CPU in the target LPM is between a sleep time of the CPU in the target LPM and the timer value of the CPU; determining the prediction as an inaccurate prediction based on a determination that the response time of the CPU in the target LPM is between the sleep time of the CPU in the target LPM and the timer value of the CPU; determining the prediction as an accurate prediction, based on a determination of one of the following: the response time of the CPU in target LPM is longer than the sleep time of the CPU in the LPM and the timer value of the CPU; the response time of the CPU in the target LPM is less than the sleep time of the CPU in the LPM and the timer value of the CPU; a difference between the sleep time of the CPU in the LPM and the timer value of the CPU is less than a pre-determined threshold; counting the prediction accuracy rate after predicting the next wake-up moment of the CPU by using the timer value as the prediction condition for a pre-determined number of times.

In an implementation, the at least one processor carrying out the action of counting the prediction accuracy rate is caused to carry out actions, including: counting the prediction accuracy rate by determining situations corresponding to accurate predictions and inaccurate predictions as a full set and counting a proportion of the accurate predictions in the full set.

In an implementation, the processor is a multi-core CPU.

According to a third aspect of the disclosure, there is provided a non-transitory computer-readable storage medium storing a computer program which, when executed by a processor, cause the processor to carry out following actions: determining a first prediction condition and a second prediction condition, both the first prediction condition and the second prediction condition being factors that affect a wake-up moment of a central processing unit (CPU); counting a prediction accuracy rate of predicting the CPU entering a lower power mode (LPM) by using the first prediction condition; and continuing to use the first prediction condition to predict a next wake-up moment of the CPU when the prediction accuracy rate is greater than a predetermined threshold; using the second prediction condition to predict the next wake-up moment of the CPU when the prediction accuracy rate is not greater than the predetermined threshold.

According to a fifth aspect of implementations of the present disclosure, there is provided a program product. The program product includes a computer readable storage medium for storing computer programs which, when executed, are operable with a computer to execute any method according to the implementations of the present disclosure.

Implementations of the present disclosure provide a method for managing a central processing unit. As illustrated in FIG. 1, the method starts with operations at block 101.

At block 101, a first prediction condition and a second prediction condition are determined and both the first prediction condition and the second prediction condition are factors that affect a wake-up moment of a central processing unit (CPU).

There may be many factors affecting the wake-up moment of the CPU, at present, mainly including a timer and an interrupt. The first prediction condition and the second prediction condition are determined according to the factors that affect the wake-up moment of the CPU, which is not specifically limited in the implementations of the disclosure. In this implementation of the present disclosure, a timer value can be understood as a timer value of the CPU or a timer value of a system.

At block 102, a prediction accuracy rate of predicting the CPU entering a lower power mode (LPM) by using the first prediction condition is counted.

In other words, the operations at block 102 can also be implemented by counting a prediction accuracy rate of predicting the next wake-up moment of the CPU by using the first prediction condition.

In this implementation of the present disclosure, after predicting a next wake-up moment of the CPU by using a prediction condition, the CPU may select to enter an appropriate LPM, since a prediction accuracy may be affected by practical conditions, such as changes of the state of the CPU, there is a possibility that the LPM that the CPU enters is not necessarily appropriate. Therefore, there will be a certain proportion of inaccurate predictions. Which LPM to be entered may have something to do with a time period from the current moment to the predicted next wake-up moment.

At block 103, continue to use the first prediction condition to predict the next wake-up moment of the CPU when the prediction accuracy rate is greater than a predetermined threshold; turn to use the second prediction condition to predict the next wake-up moment of the CPU when the prediction accuracy rate is not greater than the predetermined threshold.

The predetermined threshold may be an arbitrary threshold. The predetermined threshold is configured to determine whether the first prediction condition is able to predict the next wake-up moment of the CPU accurately and therefore, the higher the predetermined threshold, the higher the requirement for the prediction accuracy. It can be understood that the higher the setting of the predetermined threshold, the more frequent the switching of prediction conditions. Everything considered, it will be appropriate to set the predetermined threshold to about 60%. It should be understood that, setting the predetermined threshold to other values does not affect the implementation of the implementations of the present disclosure.

In the implementation of the present disclosure, by using a prediction condition to predict the next wake-up moment of the CPU, counting the prediction accuracy rate, and considering influences of various factors on the next wake-up moment of the CPU, the next wake-up moment of the CPU can be predicted accurately and allows the CPU to choose an appropriate LPM, which makes it possible to balance the power consumption and performance requirements of the CPU. Therefore, a higher CPU performance can be maintained while maintaining low power consumption.

As a specific implementation, the first prediction condition is a timer value, and the second prediction condition is an interrupt moment.

In implementations of the present disclosure, there can be many types of LPMs. For example, the LPM includes at least one of: a waiting-for-interrupt mode, a suspending mode, and a power-down mode.

It can be understood that the LPM may also take other forms. In implementations of the present disclosure, after predicting the next wake-up moment of the CPU, choose which LPM to enter. Therefore, the forms or types of LPM will not affect the execution of the previous prediction. The above examples should not be understood as any limit to the implementations of the present disclosure.

The implementations of the present discourse also provide a solution of how to count the prediction accuracy rate. The prediction accuracy rate of predicting the CPU entering the LPM by using the first prediction condition is counted as follows.

After the next wake-up moment of the CPU is predicted by using the timer value as a prediction condition and the CPU enters the target LPM, a response time of the CPU in a target LPM is determined. Determine whether a response time of the CPU in the target LPM is between a sleep time of the CPU in the target LPM and the timer value of the CPU. The prediction is determined as an inaccurate prediction if the response time (moment) of the CPU in the target LPM is between the sleep time of the CPU in the target LPM and the timer value of the CPU. In this implementation of the present disclosure, the sleep time of the CPU in the target LPM can refer to the beginning of the seep time, and the response time of the CPU in the target LPM may refer to a moment that the CPU responds to an interrupt. When the response moment of the CPU in the target LPM is between the beginning of the sleep time of the CPU in the target LPM and the timer value of the CPU, the CPU is still in the target PLM (that is in the sleep period) and cannot respond to an interrupt, so the prediction of predicting the next wake-up moment of the CPU by using the timer value is determined as an inaccurate prediction.

The prediction accuracy rate is counted after predicting the next wake-up moment of the CPU by using the timer value as the prediction condition for a pre-determined number of times.

In this implementation, based on using the timer value and the interrupt moment as factors affecting the wake-up moment of the CPU, approaches of determining inaccurate predictions are provided. It should be noted that, if a difference between the sleep time of the CPU in the LPM and the timer value of the CPU is less than a pre-determined threshold, a prediction will be determined as an accurate prediction even if the response time of the CPU in the target LPM is between the sleep time of the CPU in the target LPM and the timer value of the CPU. In this implementation of the present disclosure, the sleep time of the CPU in the target LPM can refer to the end of the seep time, and the response time of the CPU in the target LPM may refer to the moment that the CPU responds to the interrupt.

The implementations of the present discourse also provide another solution of how to count the prediction accuracy rate. The prediction accuracy rate of predicting the CPU entering the LPM by using the first prediction condition is counted as follows.

A prediction is determined as an accurate prediction, if: the response time of the CPU in the target LPM is longer than the sleep time of the CPU in the LPM and the timer value of the CPU (here, the sleep time of the CPU in the target LPM can refer to the end of the seep time, and the response time of the CPU in the target LPM may refer to a moment that the CPU responds to an interrupt, that is, the moment that the CPU responds to the interrupt is after both the end of the seep time of the CPU in the LPM and the timer value of the CPU); or, the response time of the CPU in the LPM is less than the sleep time of the CPU in the LPM and the timer value of the CPU (here, the sleep time of the CPU in the target LPM can refer to the end of the seep time, and the response time of the CPU in the target LPM may refer to a moment that the CPU responds to an interrupt, that is, the moment that the CPU responds to the interrupt is before both the end of the seep time of the CPU in the LPM and the timer value of the CPU); or, a difference between the sleep time of the CPU in the LPM and the timer value of the CPU is less than the pre-determined threshold (here, the sleep time of the CPU in the target LPM can refer to the end of the seep time, and the response time of the CPU in the target LPM may refer to a moment that the CPU responds to an interrupt, that is, the difference between the end of the sleep time of the CPU in the LPM and the timer value of the CPU is less than the pre-determined threshold).

The prediction accuracy rate is counted after predicting the next wake-up moment of the CPU by using the timer value as the prediction condition for a pre-determined number of times.

Understandably, it is possible to count the prediction accuracy rate by excluding inaccurate predictions and determining other situations corresponding to accurate predictions, therefore the process of determining a prediction as an accurate prediction is not necessarily conducted. In addition, the prediction accuracy rate can be also counted by determining situations corresponding to accurate predictions as an accurate set and determining situations that do not belong to the accurate set as inaccurate predictions without considering how to determine a prediction as an inaccurate prediction. Therefore, solutions of how to determine a prediction as an accurate prediction and solutions of how to determine a prediction as an inaccurate prediction can exist independently. At the same time, these two solutions can both be considered together.

As an implementation, the method for managing a CPU can be applicable for managing a multi-core CPU.

In a system with multiple cores (that is, multiple CPUs or a multi-core CPU), by setting the CPU to a more appropriate LPM state, a scheduler of an operating system can accurately assign tasks to an appropriate CPU, the power consumption and scheduling overhead of the system can be reduced, and operating performance of the system can be improved.

Based on the above description, the implementations of the present disclosure provide a new LPM Governor algorithm, which allows reducing power consumption and improving performance of a multi-core system. The design principle is as follows. Comparison between the last time that the CPU was in the LPM and the last value of the timer of the system is conducted. When both the last time and the last value are in a same range of response time in the LPM, it indicates that prediction of the next wake-up moment of the CPU by using the termer of the system is accurate; otherwise, it indicates that prediction of the next wake-up moment of the CPU by using the termer of the system is inaccurate. The LPM Governor algorithm counts the comparison results of past several times (for example, five times) to determine the prediction accuracy rate. When the prediction accuracy rate is good (for example, the prediction accuracy rate is higher than 60%), continue to use the timer value for prediction; otherwise, the last interrupt-to-wake up time (that is, the interrupt moment) of the CPU is used to predict the next wake-up moment of the CPU. This can better reflect the impact of the interrupt on the CPU and improve the response speed of the CPU to a sudden CPU demand for instantly changing scenes. At the same time, the LPM Governor algorithm uses the response time of the CPU in different LPMs as a comparison threshold, so that a decision for CPU state switching can directly reflect different characteristics of the CPU, and the pertinence and accuracy are better. In a scenario where the CPU is woken up frequently (that is, there are more interrupts), the LPM Governor algorithm can maintain high CPU performance while maintaining low power consumption.

Therefore, the prediction accuracy by using the timer value can be evaluated by comparing the timer of the system and the wake-up moment of the CPU. A predicted value can be corrected in real time in scenarios where interrupts occur frequently, so that the next wake-up moment of the CPU can be predicted accurately, thereby making the CPU to enter a more appropriate LPM and maintaining a better CPU performance while keeping low power consumption as much as possible.

In general, the CPU is operable with several classical LPMs. The CPU in different LPMs has different response time and power consumption characteristic. For example, in a waiting-for-interrupt (WFI) mode, the CPU has the fastest response but the largest power consumption; in a suspending/retention mode, the CPU has moderate response and moderate power consumption; in a power-down mode, the CPU responds the slowest but the most power-efficient. Obviously, in situations where interrupts/task scheduling occurs frequently and require real-time CPU response, the WFI mode is appropriate. For a system in a long-term sleep mode, the power-down mode is appropriate.

When the CPU is in an idle state and there is a need to select a LPM to enter, generally, a common idea at present is to predict the next wake-up moment of the CPU, and find a LPM satisfying the wake-up moment (that is, the response time of the CPU in the LPM<next wake-up moment) and with a lowest power consumption level.

Main factors that affect the next wake-up moment of the CPU include a timer and an interrupt, which will be described below.

1. Timer.

Each CPU has its own timer. Drivers, kernel modules, and applications, etc. can set different timers according to their own needs. The timer of the CPU usually refers to the timer that will expire recently.

2. Interrupt

The interrupt includes internal interrupts of the scheduler and external interrupts of the system. In the case of less interrupts, it can be anticipated that the CPU will not be woken up in the LPM until the timer expires. In the case of more interrupts, the CPU will be woken up by an interrupt before the timer expires, so the time of the CPU in the LPM will be less than the timer value. Therefore, whether the current system is busy (that is, when there are more interrupts) can be determined by comparing the last time of the CPU entering the LPM with the last timer. For easy explanation of the algorithm process, several basic variables are defined as follows.

$L_i$: represent a certain LPM, such as WFI, suspend, etc.

$TL_i$: represent response time of the CPU corresponding to a certain LPM $L_i$;

SLi: represent sleep time the CPU in a certain LPM Li;
Ttimer: represent a timer value of the CPU;
Eli: represent a predicted next wake-up moment of the CPU.

Figure 2:
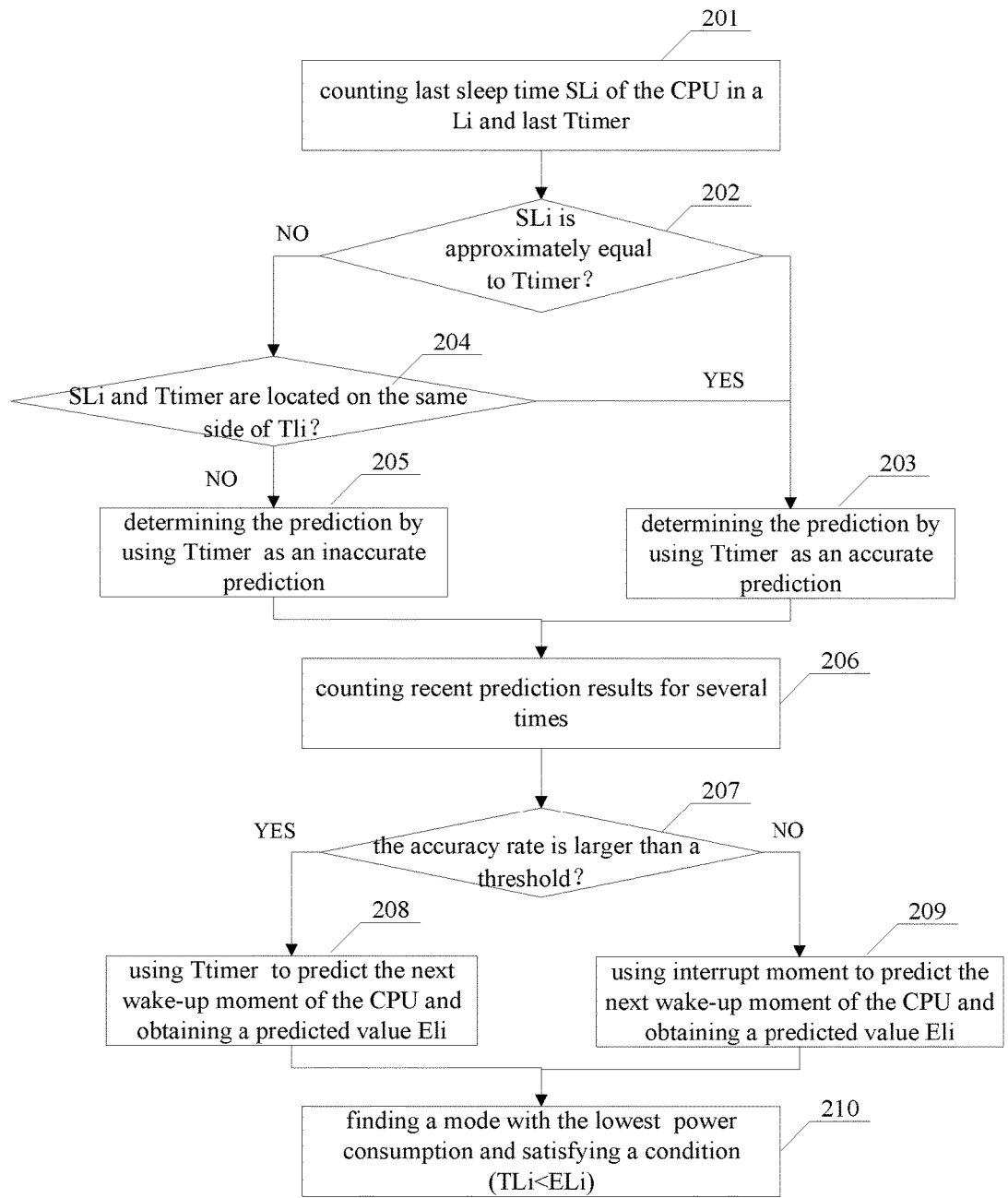
FIG. 2 is a schematic flow chart of a method for managing a central processing unit according to an implementation of the present disclosure.

Based on this, as illustrated in FIG. 2, the process includes the following operations.

At block 201, last sleep time SLi of the CPU in Li and last Ttimer are counted.

Subsequent processes at block 202 to 205 relate to operations of elevating Ttimer.

At block 202, determine whether SLi is approximately equal to Ttimer. If yes, proceed to operations at block 203; otherwise, proceed to operations at block 204.

When SLi is approximately equal to or slightly smaller than Ttimer, this indicates that the CPU is not woken up by an interrupt in the last Li. The last Ttimer predicted the wake-up moment of the CPU accurately, and the prediction is accurate.

At block 203, the prediction by using Ttimer is determined as an accurate prediction, proceed to operations at block 206.

At block 204, determine whether SLi and Ttimer are located on the same side of TLi. If yes, proceed to operations at block 203; otherwise, proceed to operations at block 205.

At block 202, there are situations where SLi is not approximately equal to Ttimer, that is, where the difference between SLi and Ttimer is relatively large.

One situation is that, both SLi and Ttimer are greater than or less than TLi, that is, both of them fall on the same side of TLi in the LPM, which indicates that interrupts have a large impact on wakeup of the CPU, but SLi and Ttimer are still within the same range of response time in the LPM. In this case, although it is less accurate to continue to use the timer for prediction, it will not affect the CPU to enter a correct LPM, so the prediction can still be considered as an accurate prediction.

Another situation is that, SLi is on one side of TLi and Ttimer is on the other side of TLi, which indicates that the impact of the interrupts is obvious and Ttimer is insufficient as a judging criterion of entering a correct LPM. Therefore, the prediction by using Ttimer is an inaccurate prediction and the impact of the interrupts needs to be taken into consideration in the next prediction.

At block 205, the prediction by using Ttimer is determined as an inaccurate prediction; proceed to operations at block 206.

At block 206, recent prediction results for several times are counted.

Recent prediction results for N times (such as five times) can be counted herein. Of course, other number of times can also be set and the implementations of the present disclosure are not particularly restricted. When the prediction accuracy rate is larger than a certain threshold (such as 60%), the timer can continue to be used for the next prediction; otherwise, the last moment when the CPU is woken up by an interrupt is used to predict the next wake-up moment.

At block 207, determine the prediction accuracy rate is larger than a threshold; if yes, proceed to operations at block 208, otherwise, proceed to operations at block 209.

At block 208, Ttimer is used to predict the next wake-up moment of the CPU and a predicted value Eli is obtained, and then proceed to operations at block 210.

At block 209, the next wake-up moment of the CPU is predicted by using the interrupt moment and a predicted value Eli is obtained, and then proceed to operations at block 210.

At block 210, Based on the predicted value Eli, a mode with the lowest power consumption and satisfying a condition (TLi<ELi) is found from among all LPMs.

In the implementation of the present disclosure, for the prediction of the next wake-up moment of the CPU, both the timer and the interrupt are taken into account. A prediction effect is evaluated by comparing time that the CPU is actually in the LPM and the system timer. When the prediction accuracy rate is lower than a certain threshold, switch to using an interrupt wake-up moment for prediction, which can balance power consumption and performance.

In implementations of the disclosure, instead of obtaining the sleep time in the LPM by calculating and fitting based on statistical data of time in the LPM in the past, prediction by using the timer in the past is evaluated according to the response time of the CPU in the LPM on the base of CPU characteristic directly. The idea of the algorithm is simple, and the system overhead of the chip entering and leaving various LPMs is optimized.

Figure 2A:
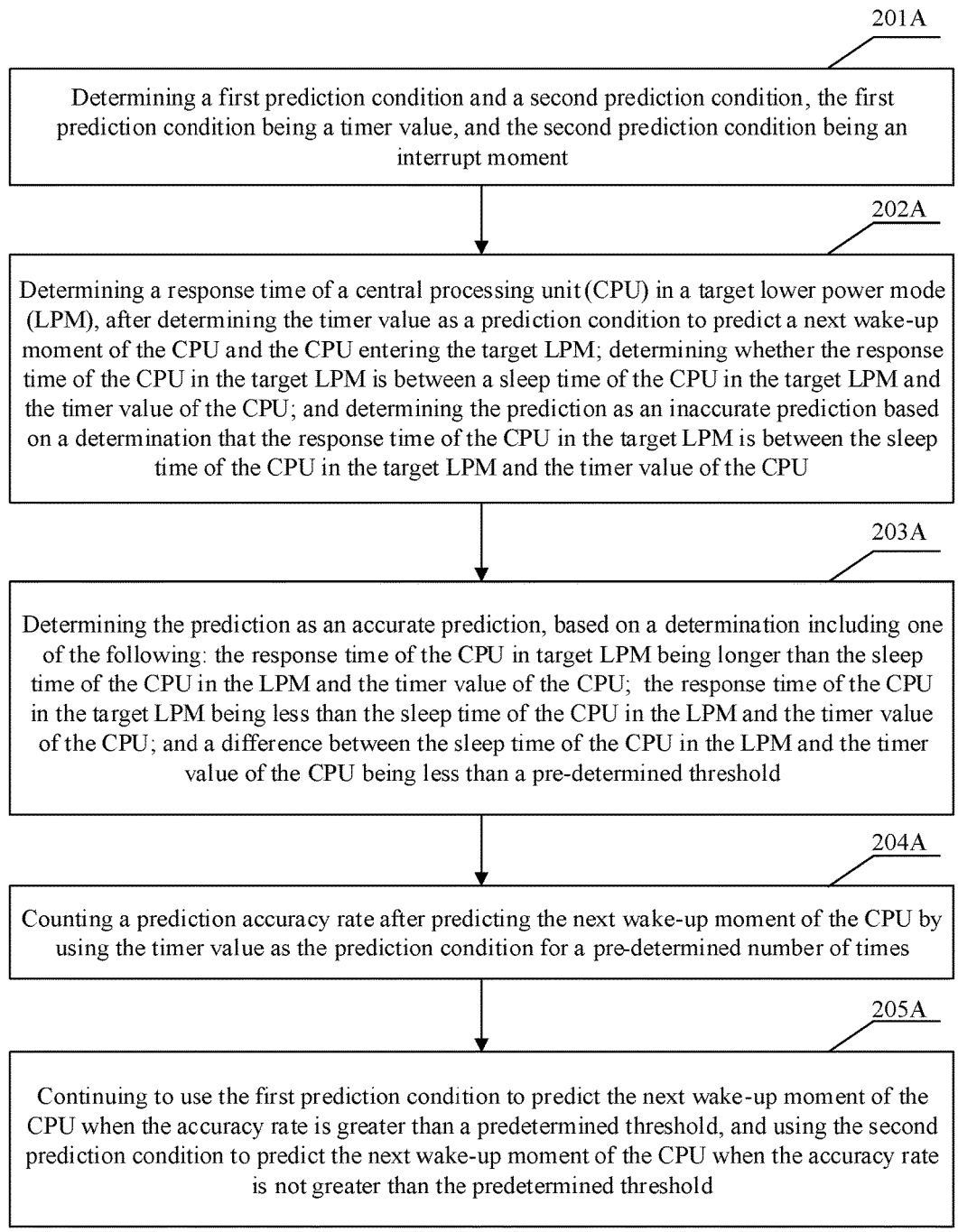
FIG. 2A is a schematic flow chart of a method for managing a central processing unit according to an implementation of the present disclosure.

The implementations of the present disclosure provide a method for managing a CPU. As illustrated in FIG. 2A, the method starts with operations at block 251.

At block 201A, a first prediction condition and a second prediction condition is determined, where the first prediction condition is a timer value and the second prediction condition is an interrupt moment.

At block 202A, a response time of a CPU in a target LPM is determined, after the timer value is determined as a prediction condition to predict a next wakeup moment of the CPU and the CPU enters the target LPM; whether the response time of the CPU in the target LPM is between a sleep time of the CPU in the target LPM and the timer value of the CPU is determined; and the prediction is determined as an inaccurate prediction based on a determination that the response time of the CPU in the target LPM is between the sleep time of the CPU in the target LPM and the timer value of the CPU.

At block 203A, the prediction is determined as an accurate prediction, based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold.

At block 204A, a prediction accuracy rate is counted after the next wake-up moment of the CPU is predicted by using the timer value as the prediction condition for a pre-determined number of times.

At block 205A, continue to use the first prediction condition to predict a next wake-up moment of the CPU when the prediction accuracy rate is greater than a predetermined threshold, and the second prediction condition is used to predict the next wake-up moment of the CPU when the prediction accuracy rate is not greater than the predetermined threshold.

In one implementation, the LPM includes at least one of: a waiting-for-interrupt mode, a suspending mode, and a power-down mode.

In one implementation, the method for managing a CPU is applicable for managing a multi-core CPU.

Figure 3:
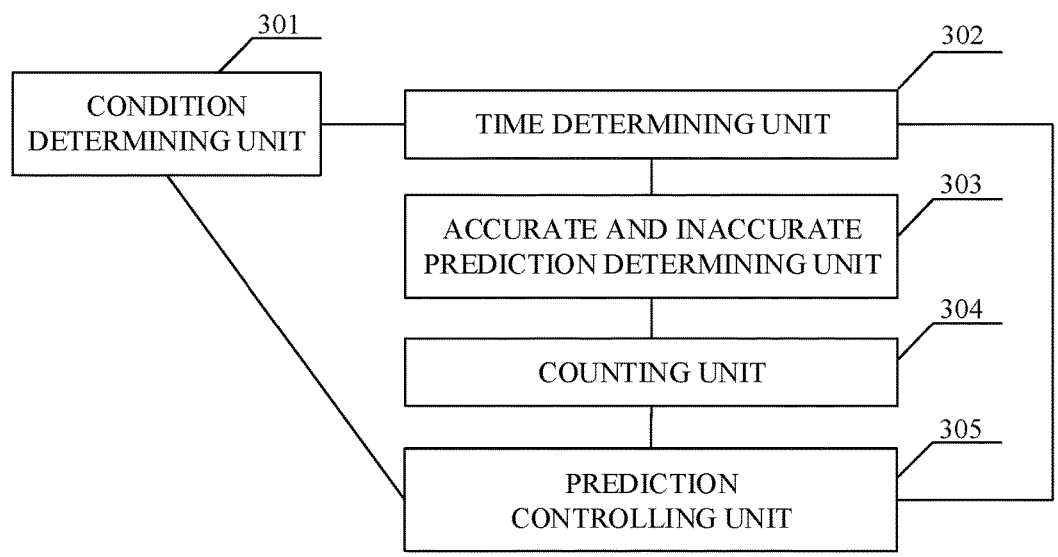
FIG. 3 is a schematic flow chart of an apparatus for managing a central processing unit according to an implementation of the present disclosure.

The implementations of the present disclosure provide an apparatus for managing a central processing unit. As illustrated in FIG. 3, the apparatus for managing a central processing unit includes a condition determining unit 301, a time determining unit 302, an accurate and inaccurate prediction determining unit 303, a counting unit 304, and a prediction controlling unit 305.

The condition determining unit 301 is configured to determine a first prediction condition and a second prediction condition, the first prediction condition being a timer value and the second prediction condition being an interrupt moment.

The time determining unit 302 is configured to determine a response time of a CPU in a LPM, after the prediction controlling unit determines the timer value as a prediction condition to predict a next wake-up moment of the CPU and the CPU enters the target LPM.

The accurate and inaccurate prediction determining unit 303 is configured to determine whether the response time of the CPU in the target LPM is between a sleep time of the CPU in the target LPM and the timer value of the CPU, to determine the prediction as an inaccurate prediction based on a determination that the response time of the CPU in the target LPM is between the sleep time of the CPU in the target LPM and the timer value of the CPU, and to determine the prediction as an accurate prediction based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold.

The counting unit 304 is configured to count a prediction accuracy rate after predicting the next wake-up moment of the CPU by using the timer value as the prediction condition for a pre-determined number of times.

The prediction controlling unit 305 is configured to continue to use the first prediction condition to predict the next wake-up moment of the CPU when the counting unit 304 determines that the prediction accuracy rate is greater than a predetermined threshold, and to use the second prediction condition to predict the next wake-up moment of the CPU when the counting unit 304 determines that the prediction accuracy rate is not greater than the predetermined threshold.

There may be many factors affecting the wake-up moment of the CPU, at present mainly including a timer and an interrupt. The first prediction condition and the second prediction condition are determined according to the factors that affect the wake-up moment of the CPU. In this implementation of the present disclosure, a timer value can be understood as a timer value of the CPU or a timer value of a system.

In this implementation of the present disclosure, after predicting a next wake-up moment of the CPU by using a prediction condition, the CPU may select to enter an appropriate LPM, since a prediction accuracy may be affected by practical conditions, such as changes of the state of the CPU, there is a possibility that the LPM that the CPU enters is not necessarily appropriate. Therefore, there will be a certain proportion of inaccurate predictions.

The predetermined threshold may be an arbitrary threshold. The predetermined threshold is configured to determine whether the first prediction condition is able to predict the next wake-up moment of the CPU accurately and therefore, the higher the predetermined threshold, the higher the requirement for the prediction accuracy. It can be understood that the higher the setting of the predetermined threshold, the more frequent the switching of prediction conditions. Everything considered, it will be appropriate to set the predetermined threshold to about 60%. It should be understood that, setting the predetermined threshold to other values does not affect the implementation of the implementations of the present disclosure.

In the implementation of the present disclosure, by using a prediction condition to predict the next wake-up moment of the CPU, counting the prediction accuracy rate, and considering influences of various factors on the next wake-up moment of the CPU, the next wake-up moment of the CPU can be predicted accurately and allows the CPU to choose an appropriate LPM, which makes it possible to balance the power consumption and performance requirements of the CPU. Therefore, a higher CPU performance can be maintained while maintaining low power consumption.

In implementations of the present disclosure, there can be many types of LPMs. For example, the LPM includes at least one of: a waiting-for-interrupt mode, a suspending mode, and a power-down mode.

It can be understood that the LPM may also take other forms. In the implementation of the present disclosure, after predicting the next wake-up moment of the CPU, choose which LPM to enter. Therefore, the forms or types of LPM will not affect the execution process of the previous prediction. The above examples should not be understood as any limit to the implementations of the present disclosure.

In this implementation, based on using the timer value and the interrupt moment as factors affecting the wake-up moment of the CPU, approaches of determining inaccurate predictions are provided. It should be noted that, if a difference between the sleep time of the CPU in the LPM and the timer value of the CPU is less than a pre-determined threshold, a prediction will be determined as an accurate prediction even if the response time of the CPU in the target LPM is between the sleep time of the CPU in the target LPM and the timer value of the CPU.

Understandably, it is possible to count the prediction accuracy rate by excluding inaccurate predictions and determining other situations corresponding to accurate predictions, therefore the process of determining a prediction as an accurate prediction is not necessarily conducted. In addition, the prediction accuracy rate can be also counted by determining situations corresponding to accurate predictions as an accurate set and determining situations that do not belong to the accurate set as inaccurate predictions without considering how to determine a prediction as an inaccurate prediction. Therefore, solutions of how to determine a prediction as an accurate prediction and solutions of how to determine a prediction as an inaccurate prediction can exist independently. At the same time, these two solutions can both be considered together.

As an implementation, the apparatus for managing a CPU can be applicable for managing a multi-core CPU.

The above units can be realized through one or more processors, for example, the above units can be integrated in one processor, or, can be distributed among different processors.

In a system with multiple cores (that is, multiple CPUs or a multi-core CPU), by setting the CPU to a more appropriate LPM state, a scheduler of an operating system can accurately assign tasks to an appropriate CPU, the power consumption and scheduling overhead of the system can be reduced, and operating performance of the system can be improved.

Figure 4:
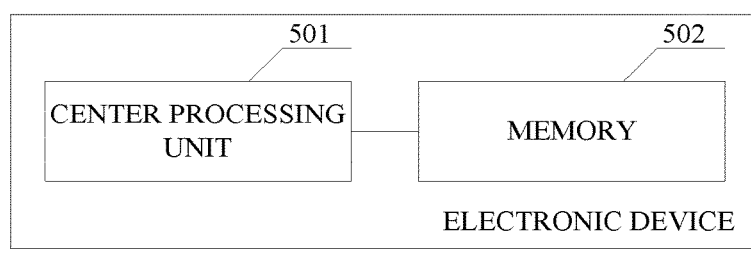
FIG. 4 is a schematic structural diagram of an electronic device according to an implementation of the present disclosure.

The implementations of the present disclosure also provide an electronic device. As illustrated in FIG. 4, the electronic device includes a center processing unit (CPU) 501 and a memory 502. The memory 502 is configured to be used as a buffer memory required by the processor 501 to perform data processing. The memory 502 is further configured to provide a memory space for data called by the processor 501 to perform data processing and obtained result data. The electronic device may further include other hardware devices, which are not limited in this implementation.

The processor 501 is configured to determine a first prediction condition and a second prediction condition, the first prediction condition being a timer value and the second prediction condition being an interrupt moment. The processor 501 is configured to determine a response time of a CPU in a LPM, after determining the timer value as a prediction condition to predict a next wake-up moment of the CPU and the CPU enters the target LPM. The processor 501 is configured to determine whether the response time of the CPU in the target LPM is between a sleep time of the CPU in the target LPM and the timer value of the CPU, to determine the prediction as an inaccurate prediction based on a determination that the response time of the CPU in the target LPM is between the sleep time of the CPU in the target LPM and the timer value of the CPU, and to determine the prediction as an accurate prediction based on a determination of one of the following: the response time of the CPU in target LPM being longer than the sleep time of the CPU in the LPM and the timer value of the CPU; the response time of the CPU in the target LPM being less than the sleep time of the CPU in the LPM and the timer value of the CPU; and a difference between the sleep time of the CPU in the LPM and the timer value of the CPU being less than a pre-determined threshold. The processor 501 is configured to count a prediction accuracy rate after predicting the next wake-up moment of the CPU by using the timer value as the prediction condition for a pre-determined number of times. The processor 501 is configured to continue to use the first prediction condition to predict the next wake-up moment of the CPU when the prediction accuracy rate is greater than a predetermined threshold, and to use the second prediction condition to predict the next wake-up moment of the CPU when the prediction accuracy rate is not greater than the predetermined threshold.

In this implementation of the present disclosure, after predicting a next wake-up moment of the CPU by using a prediction condition, the CPU may select to enter an appropriate LPM, since a prediction accuracy may be affected by practical conditions, such as changes of the state of the CPU, there is a possibility that the LPM that the CPU enters is not necessarily appropriate. Therefore, there will be a certain proportion of inaccurate predictions.

The predetermined threshold may be an arbitrary threshold. The predetermined threshold is configured to determine whether the first prediction condition is able to predict the next wake-up moment of the CPU accurately and therefore, the higher the predetermined threshold, the higher the requirement for the prediction accuracy. It can be understood that the higher the setting of the predetermined threshold, the more frequent the switching of prediction conditions. Everything considered, it will be appropriate to set the predetermined threshold to about 60%. It should be understood that, setting the predetermined threshold to other values does not affect the implementation of the implementations of the present disclosure.

In the implementation of the present disclosure, by using a prediction condition to predict the next wake-up moment of the CPU, counting the prediction accuracy rate, and considering influences of various factors on the next wake-up moment of the CPU, the next wake-up moment of the CPU can be predicted accurately and allows the CPU to choose an appropriate LPM, which makes it possible to balance the power consumption and performance requirements of the CPU. Therefore, a higher CPU performance can be maintained while maintaining low power consumption.

In implementations of the present disclosure, there can be many types of LPMs. For example, the LPM includes at least one of: a waiting-for-interrupt mode, a suspending mode, and a power-down mode.

It can be understood that the LPM may also take other forms. In the implementation of the present disclosure, after predicting the next wake-up moment of the CPU, choose which LPM to enter. Therefore, the forms or types of LPM will not affect the execution of the previous prediction. The above examples should not be understood as any limit to the implementations of the present disclosure.

A prediction accuracy rate is counted after predicting the next wake-up moment of the CPU by using the timer value as the prediction condition for a pre-determined number of times.

In this implementation, based on using the timer value and the interrupt moment as factors that affect the wake-up moment of the CPU, approaches of determining inaccurate predictions are provided. It should be noted that, if a difference between the sleep time of the CPU in the LPM and the timer value of the CPU is less than a pre-determined threshold, a prediction will be determined as an accurate prediction even if the response time of the CPU in the target LPM is between the sleep time of the CPU in the target LPM and the timer value of the CPU.

The implementations of the present discourse also provide a solution of how to determine a prediction as an accurate prediction based on the above-mentioned approaches of determining inaccurate predictions. The processor 501 is configured to determine a prediction as an accurate prediction if: the response time of the CPU in the target LPM is longer than the sleep time of the CPU in the LPM and the timer value of the CPU; or the response time of the CPU in the LPM is less than the sleep time of the CPU in the LPM and the timer value of the CPU; or a difference between the sleep time of the CPU in the LPM and the timer value of the CPU is less than the pre-determined threshold.

Understandably, it is possible to count the prediction accuracy rate by excluding inaccurate predictions and determining other situations corresponding to accurate predictions, therefore the process of determining a prediction as an accurate prediction is not necessarily conducted. In addition, the prediction accuracy rate can be also counted by determining situations corresponding to accurate predictions as an accurate set and determining situations that do not belong to the accurate set as inaccurate predictions without considering how to determine a prediction as an inaccurate prediction. Therefore, solutions of how to determine a prediction as an accurate prediction and solutions of how to determine a prediction as an inaccurate prediction can exist independently. At the same time, these two solutions can also both be considered together.

As an implementation, the processor 501 of the electronic device can be a multi-core CPU. The electronic device is applicable for managing a multi-core CPU.

In a system with multiple cores (that is, multiple CPUs or a multi-core CPU), by setting the CPU to a more appropriate LPM state, a scheduler of an operating system can accurately assign tasks to an appropriate CPU, the power consumption and scheduling overhead of the system can be reduced, and operating performance of the system can be improved.

Figure 5:
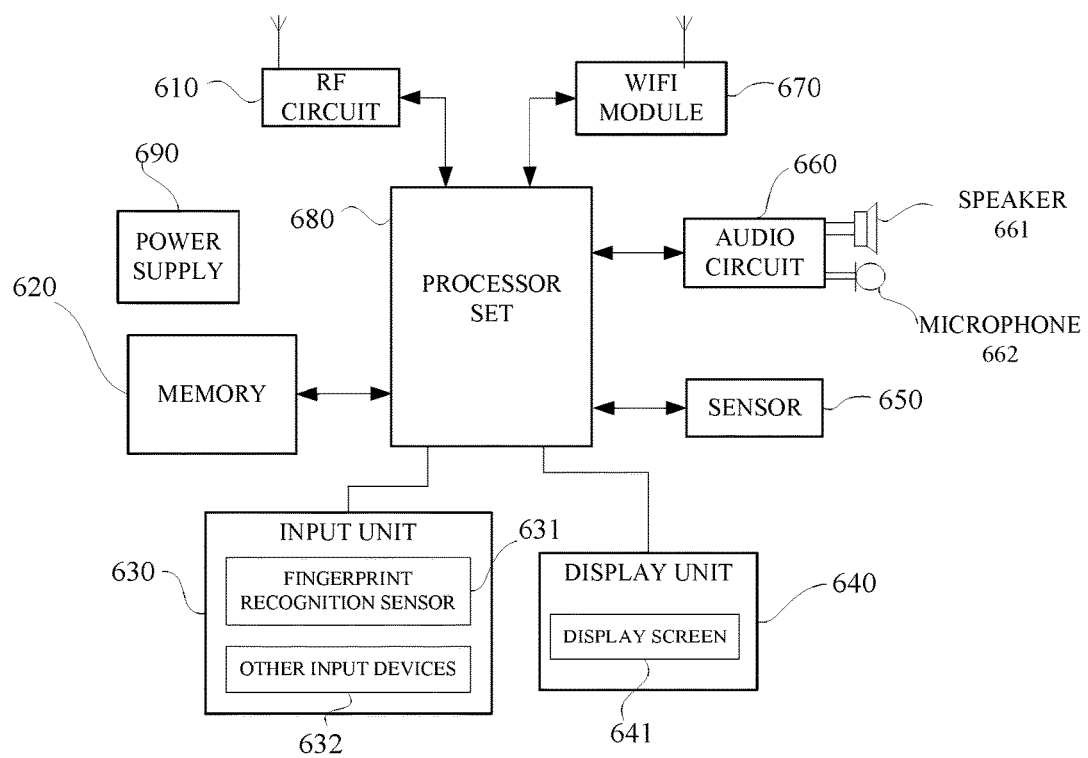
FIG. 5 is a schematic structural diagram of an electronic device according to an implementation of the present disclosure.

The implementations of the present disclosure further provide an electronic device. As illustrated in FIG. 5, only parts related to the implementations of the present disclosure are illustrated for ease of description. For technical details not described, reference may be made to the method implementations of the present disclosure. The electronic device may be any electronic device, such as a mobile phone, a tablet computer, a personal digital assistant (PDA), a point of sale terminal (POS), an on-board computer and the like. The following describes the mobile phone as an example of the electronic device.

FIG. 5 is a schematic structural diagram of a part of a structure of a mobile phone related to an electronic device according to an implementation of the present disclosure. As illustrated in FIG. 5, the mobile phone includes a RF (radio frequency) circuit 610, a memory 620, an input unit 630, a display unit 640, a sensor 650, an audio circuit 660, a Wi-Fi (wireless fidelity) module 670, a processor set 680, a power supply 690 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The RF circuit 610 may be configured to receive and transmit a signal during the process of sending or receiving information, or calling. In some possible implementations, the RF circuit 610 receives downlink information from a base-station and passes the downlink information to processor set 680 for processing; furthermore, the RF circuit 610 sends data related to uplink to the base-station. Generally, the RF circuit 610 includes but is not limited to an antenna, at least one amplifier, a transceiver, a coupler, a low noise amplifier (LNA), a duplexer and the like. In addition, the RF circuit 610 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 620 is configured to store software programs and modules. The processor set 680 is configured to execute various function applications and data processing of the mobile phone by running the software programs and the modules stored in the memory 620. The memory 620 mainly includes a program storage area and a data storage area. The program storage area may store an operating system, applications (such as sound playing function, image playing function, etc.) required for at least one function and so on. The data storage area may store data (such as audio data, phone book, etc.) created according to use of the mobile phone, and so on. In addition, the memory 620 may include a high-speed RAM, and may further include a non-volatile memory such as at least one disk storage device, a flash device, or other non-volatile solid storage devices.

The input unit 630 may be configured to receive input digital or character information and generate key signal input associated with user setting and functional control of the mobile phone. In some possible implementations, the input unit 630 may include a touch panel 631 and other input devices 632. The touch panel 631, also referred to a touch display screen, can collect a touch operation of the user on or near the touch panel 631 (such as an operation of user on or near the touch panel 631 with fingers, stylus and any other suitable objects or attachments) and drive a corresponding connection apparatus based on a pre-set form. In some possible implementations, the touch panel 631 can include two parts: a touch detecting apparatus and a touch controller. The touch detecting apparatus can detect a touch orientation of the user, detect a signal brought by the touch operation, and send the signal to the touch controller. The touch controller receives touch information from the touch detecting apparatus, converts the touch information into a touch coordinate, sends the touch information to the processor set 680, and receives an order from the processor set 680 to conduct it. In addition, the touch panel 631 can be implemented by resistance-type, capacitance-type, infrared ray, surface acoustic wave (SAW) and other types. The input unit 630 may further include, in addition to the touch panel 631, other input devices 632. The other input devices 632 may include, but are not limited to, one or more of a physical keyboard, a functional key (such as a volume control key and a switch key), a track ball, a mouse, and an operating rod.

The display unit 640 may be configured to display information input by the user or information provided for the user or various menus of the mobile phone. The display unit 640 may include a display panel 641, and in some possible implementations, the display panel 641 may be configured in the form of a liquid crystal display (LCD), an organic light-emitting diode (OLED) and so on. In some possible implementations, the touch panel 631 can cover the display panel 641. After the touch panel 631 detects the touch operation on or near the touch panel 631 and sends the touch operation to the processor set 680 to determine a type of a touch event, the then processor set 680 provides an associated visual output on the display panel 641 base on the type of the touch event. In FIG. 5, although the touch panel 631 and the display panel 641 implement input and output functions by serving as two independent components, the touch panel 631 may be integrated with the display panel 641 to implement the input and output functions in some possible implementations.

The mobile phone may also include at least one sensor 650, such as a light sensor, a motion sensor, and other sensors. As one implementation, the light sensor may include an ambient light sensor and a proximity sensor, among which the ambient light sensor may adjust the brightness of the display panel 641 according to ambient lights. The proximity sensor may turn off the display panel 641 and/or backlight when the mobile phone reaches nearby the ear. As a kind of motion sensor, a accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 660, a speaker 661, and a microphone 662 may provide an audio interface between the user and the mobile phone. The audio circuit 660 may convert the received audio data into electrical signals and transfer the electrical signals to the speaker 661; thereafter the speaker 661 converts the electrical signals into sound signals to output. On the other hand, the microphone 662 converts the received sound signals into electrical signals, which will be received and converted into audio data by the audio circuit 660 to output. The audio data is then processed and transmitted by the processor 581 via a RF circuit 610 to another mobile phone for example, or, the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media and the like. Wi-Fi provides users with wireless broadband Internet access. Although the Wi-Fi module 670 is illustrated in FIG. 5, it should be understood that the Wi-Fi module 670 is not essential to the mobile phone and can be omitted according to actual needs without departing from the essential nature of the present disclosure.

The processor set 680 is a control center of the mobile phone, and is configured to connect all parts of the whole mobile phone by utilizing various interfaces and lines, to run or execute the software programs and/or the modules stored in the memory 620 and call data stored in the memory 620 to execute various functions and processing data of the terminal 500, so as to wholly monitor the mobile phone. In some implementations, the processor set 680 may include one or more processing cores. In some possible implementations, the processor set 680 may be integrated with an application processor and a modulation-demodulation processor, the application processor mainly processes an operating system, a user interface, an application program and the like, and the modulation-demodulation processor mainly processes wireless communication. It should be understood that the modulation-demodulation processor may not be integrated into the processor set 680.

The mobile phone also includes a power supply 690 (e.g., a battery) that supplies power to various components. For instance, the power supply 690 may be logically connected to the processor set 680 via a power management system to enable management of charging, discharging, and power consumption through the power management system.

Although not illustrated, the mobile phone may include a camera, a Bluetooth module, etc., and the disclosure will not elaborate herein.

In the implementation of the present disclosure, the processor set 680 included in the electronic device also has a function of controlling and performing a process of the method. The processor set 680 can be a multi-core processor.

It should be noted that, in the foregoing apparatus implementations, the included units are divided only according to functional logic, but are not limited to the foregoing division, as long as corresponding functions can be implemented. In addition, specific names of functional units are only for convenience for distinguishing from each other and are not intended to limit the scope of protection of the present disclosure.

In addition, it will be understood by those of ordinary skill in the art that all or a part of the various methods of the implementations described above may be accomplished by means of a program to instruct associated hardware, the program may be stored in a computer-readable memory, which may include a read-only memory (ROM), a disk or a compact disc (CD), and so on.

What is claimed is:

1. A method for managing a central processing unit, comprising:

determining a first prediction condition and a second prediction condition, the first prediction condition being a timer value of a central processing unit (CPU) determined as a prediction condition to predict a next wake-up moment of the CPU, the second prediction condition being an interrupt moment determined as the last interrupt-to-wake-up time, wherein both the timer value and the interrupt moment are factors that affect the next wake-up moment of the CPU;

determining a response time of the CPU in a target lower power mode (LPM), after determining the timer value as the prediction condition to predict the next wake-up moment of the CPU and the CPU enters the target LPM;

determining whether the response time of the CPU in the target LPM is between a sleep time of the CPU in the target LPM and the timer value of the CPU; and determining the prediction as an inaccurate prediction based on a determination that the response time of the CPU in the target LPM is between the sleep time of the CPU in the target LPM and the timer value of the CPU;

determining the prediction as an accurate prediction, based on a determination of one of the following:

the response time of the CPU in target LPM being longer than the sleep time of the CPU in the LPM and the timer value of the CPU;

the response time of the CPU in the target LPM being less than the sleep time of the CPU in the LPM and the timer value of the CPU; and a difference between the sleep time of the CPU in the LPM and the timer value of the CPU being less than a pre-determined threshold;

counting a prediction accuracy rate after predicting the next wake-up moment of the CPU by using the timer value as the prediction condition for a pre-determined number of times; and continuing to use the first prediction condition to predict the next wake-up moment of the CPU when the prediction accuracy rate is greater than a predetermined threshold, and using the second prediction condition to predict the next wake-up moment of the CPU when the prediction accuracy rate is not greater than the predetermined threshold.

2. The method of claim 1, wherein the LPM comprises at least one of: a waiting-for-interrupt mode, a suspending mode, and a power-down mode.

3. The method of claim 1, wherein the method for managing a CPU is applicable for managing a multi-core CPU.

4. An electronic device, comprising:

a central processing unit (CPU); and a memory;

the CPU being configured to execute actions, comprising:

determining a first prediction condition and a second prediction condition, the first prediction condition being a timer value of a central processing unit (CPU) determined as a prediction condition to predict a next wake-up moment of the CPU, the second prediction condition being an interrupt moment determined as the last interrupt-to-wake-up time, wherein both the timer value and the interrupt moment are factors that affect the next wake-up moment of the CPU;

determining a response time of the CPU in a target lower power mode (LPM), after determining the timer value as the prediction condition to predict the next wake-up moment of the CPU and the CPU enters the target LPM;

determining whether the response time of the CPU in the target LPM is between a sleep time of the CPU in the target LPM and the timer value of the CPU; and determining the prediction as an inaccurate prediction based on a determination that the response time of the CPU in the target LPM is between the sleep time of the CPU in the target LPM and the timer value of the CPU;

determining the prediction as an accurate prediction, based on a determination of one of the following:

the response time of the CPU in target LPM being longer than the sleep time of the CPU in the LPM and the timer value of the CPU;

the response time of the CPU in the target LPM being less than the sleep time of the CPU in the LPM and the timer value of the CPU; and a difference between the sleep time of the CPU in the LPM and the timer value of the CPU being less than a pre-determined threshold;

counting a prediction accuracy rate after predicting the next wake-up moment of the CPU by using the timer value as the prediction condition for a pre-determined number of times; and continuing to use the first prediction condition to predict the next wake-up moment of the CPU when the prediction accuracy rate is greater than a predetermined threshold, and using the second prediction condition to predict the next wake-up moment of the CPU when the prediction accuracy rate is not greater than the predetermined threshold.

5. The electronic device of claim 4, wherein the LPM comprises at least one of: a waiting-for-interrupt mode, a suspending mode, and a power-down mode.

6. The electronic device of claim 4, wherein the CPU of the electronic device is a multi-core CPU.

7. A non-transitory computer readable storage medium storing a computer program which, when executed by a processor, causes the processor to carry out actions, comprising:

determining a first prediction condition and a second prediction condition, the first prediction condition being a timer value of a central processing unit (CPU) determined as a prediction condition to predict a next wake-up moment of the CPU, the second prediction condition being an interrupt moment determined as the last interrupt-to-wake-up time, wherein both the timer value and the interrupt moment are factors that affect the next wake-up moment of the CPU;

determining a response time of the CPU in a target lower power mode (LPM), after determining the timer value as the prediction condition to predict the next wake-up moment of the CPU and the CPU enters the target LPM;

determining whether the response time of the CPU in the target LPM is between a sleep time of the CPU in the target LPM and the timer value of the CPU; and determining the prediction as an inaccurate prediction based on a determination that the response time of the CPU in the target LPM is between the sleep time of the CPU in the target LPM and the timer value of the CPU;

determining the prediction as an accurate prediction, based on a determination of one of the following:

the response time of the CPU in target LPM being longer than the sleep time of the CPU in the LPM and the timer value of the CPU;

the response time of the CPU in the target LPM being less than the sleep time of the CPU in the LPM and the timer value of the CPU; and a difference between the sleep time of the CPU in the LPM and the timer value of the CPU being less than a pre-determined threshold;

counting a prediction accuracy rate after predicting the next wake-up moment of the CPU by using the timer value as the prediction condition for a pre-determined number of times; and continuing to use the first prediction condition to predict the next wake-up moment of the CPU when the prediction accuracy rate is greater than a predetermined threshold, and using the second prediction condition to predict the next wake-up moment of the CPU when the prediction accuracy rate is not greater than the predetermined threshold.

8. The non-transitory computer readable storage medium of claim 7, wherein the LPM comprises at least one of: a waiting-for-interrupt mode, a suspending mode, and a power-down mode.

9. The non-transitory computer readable storage medium of claim 7, wherein the CPU of the electronic device is a multi-core CPU.

* * * * *